United States Patent
Chaki et al.

(10) Patent No.: US 10,652,730 B2
(45) Date of Patent: May 12, 2020

(54) TRAFFIC-AWARE GROUP REFORMATION IN A MULTI-GROUP P2P NETWORK

(71) Applicant: NEC Corporation, Tokyo (JP)

(72) Inventors: Prakash Chaki, Tokyo (JP); Masato Yasuda, Tokyo (JP); Kazuaki Nakajima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/744,221

(22) PCT Filed: Sep. 3, 2015

(86) PCT No.: PCT/JP2015/004483
§ 371 (c)(1),
(2) Date: Jan. 12, 2018

(87) PCT Pub. No.: WO2017/037765
PCT Pub. Date: Mar. 9, 2017

(65) Prior Publication Data
US 2018/0206110 A1    Jul. 19, 2018

(51) Int. Cl.
*H04W 8/18* (2009.01)
*H04L 12/733* (2013.01)
*H04W 40/22* (2009.01)
*H04W 76/20* (2018.01)
*H04W 24/08* (2009.01)
(Continued)

(52) U.S. Cl.
CPC ........... *H04W 8/186* (2013.01); *H04L 45/122* (2013.01); *H04W 24/08* (2013.01); *H04W 40/32* (2013.01); *H04W 76/20* (2018.02); *H04W 84/18* (2013.01)

(58) Field of Classification Search
None
See application file for complete search history.

(56) References Cited

U.S. PATENT DOCUMENTS

| 7,881,757 B2 | 2/2011 | Mizuta |
| 2008/0151801 A1* | 6/2008 | Mizuta ............... H04W 52/343 370/311 |

(Continued)

FOREIGN PATENT DOCUMENTS

| EP | 1 833 197 B1 | 9/2011 |
| JP | 2006-186446 A | 7/2006 |

(Continued)

OTHER PUBLICATIONS

"Wi-Fi Peer-to-Peer (P2P) Technical Specification Version 1.4", 2014 Wi-Fi Alliance, pp. 1-183.

(Continued)

*Primary Examiner* — Chirag G Shah
*Assistant Examiner* — Suk Jin Kang
(74) *Attorney, Agent, or Firm* — Sughrue Mion, PLLC

(57) ABSTRACT

A mechanism which can achieve enhanced network performance in wireless P2P groups is disclosed. A method for group reformation in wireless peer-to-peer (P2P) networks, includes: monitoring traffic of a first device of a first P2P group, the first device communicating with a second device of at least one second P2P group; and altering group formation of the first and second P2P groups so as to put the first device and the second device together in a single P2P group, based on monitored traffic of the first device.

15 Claims, 9 Drawing Sheets

(51) Int. Cl.
*H04W 84/18* (2009.01)
*H04W 40/32* (2009.01)

(56) References Cited

U.S. PATENT DOCUMENTS

| | | | | |
|---|---|---|---|---|
| 2012/0290730 A1* | 11/2012 | Desai | ................... | H04L 67/104 709/228 |
| 2013/0148526 A1* | 6/2013 | Hwang | ................... | H04W 4/08 370/252 |
| 2014/0032951 A1* | 1/2014 | Garg | ................. | H04W 52/0216 713/323 |
| 2014/0211705 A1* | 7/2014 | Baek | ................... | H04W 76/023 370/329 |
| 2014/0223019 A1* | 8/2014 | McCann | ............... | H04W 8/186 709/228 |
| 2014/0233549 A1* | 8/2014 | Kim | ...................... | H04W 76/14 370/338 |
| 2014/0241354 A1* | 8/2014 | Shuman | .................. | H04L 67/16 370/390 |
| 2014/0244834 A1* | 8/2014 | Guedalia | ................. | H04L 67/16 709/224 |
| 2014/0280585 A1* | 9/2014 | Smith | ..................... | H04W 4/21 709/204 |
| 2014/0348061 A1* | 11/2014 | Salkintzis | ............. | H04W 48/08 370/328 |
| 2015/0043484 A1* | 2/2015 | Jung | ..................... | H04W 76/14 370/329 |
| 2015/0110090 A1* | 4/2015 | Ding | ....................... | H04W 4/08 370/338 |
| 2015/0121470 A1* | 4/2015 | Rongo | .................... | H04W 4/70 726/4 |
| 2015/0230283 A1* | 8/2015 | Li | ......................... | H04W 76/14 455/41.1 |
| 2015/0245393 A1* | 8/2015 | Lee | ...................... | H04W 8/005 370/338 |
| 2015/0264123 A1* | 9/2015 | Smadi | ..................... | H04W 4/12 709/206 |
| 2015/0382315 A1* | 12/2015 | Sorrentino | ............ | H04W 76/14 370/329 |
| 2016/0028802 A1* | 1/2016 | Balasingh | ........... | H04L 67/1046 709/224 |
| 2016/0057215 A1* | 2/2016 | Rayanki | .............. | H04L 67/1051 709/228 |
| 2016/0127950 A1* | 5/2016 | Gupta | ................... | H04W 48/16 370/255 |
| 2016/0173586 A1* | 6/2016 | McCann | ............... | H04W 8/186 709/204 |
| 2016/0345155 A1* | 11/2016 | Lee | ....................... | H04W 48/16 |
| 2017/0085638 A1* | 3/2017 | Lee | ....................... | H04W 8/005 |
| 2017/0135056 A1* | 5/2017 | Sorrentino | ............ | H04W 76/14 |
| 2017/0164264 A1* | 6/2017 | Kato | ..................... | H04W 28/14 |
| 2017/0164374 A1* | 6/2017 | Geirhofer | ............. | H04W 8/005 |
| 2018/0097651 A1* | 4/2018 | Guedalia | ................. | H04L 67/16 |
| 2019/0141512 A1* | 5/2019 | Huang | ............. | H04W 72/0446 |

FOREIGN PATENT DOCUMENTS

| | | |
|---|---|---|
| WO | 2006067922 A1 | 6/2006 |
| WO | 2014/149928 A1 | 9/2014 |
| WO | 2015/008712 A1 | 1/2015 |
| WO | 2015/020457 A1 | 2/2015 |

OTHER PUBLICATIONS

International Search Report of PCT/JP2015/004483 dated Nov. 17, 2015 [PCT/ISA/210].
Written Opinion of PCT/JP2015/004483 dated Nov. 17, 2015 [PCT/ISA/237].
Communication dated Sep. 25, 2018, from the Japanese Patent Office in counterpart application No. 2017-564939.
Communication dated Jan. 8, 2019, from Japanese Patent Office in counterpart application No. 2017-564939.

* cited by examiner

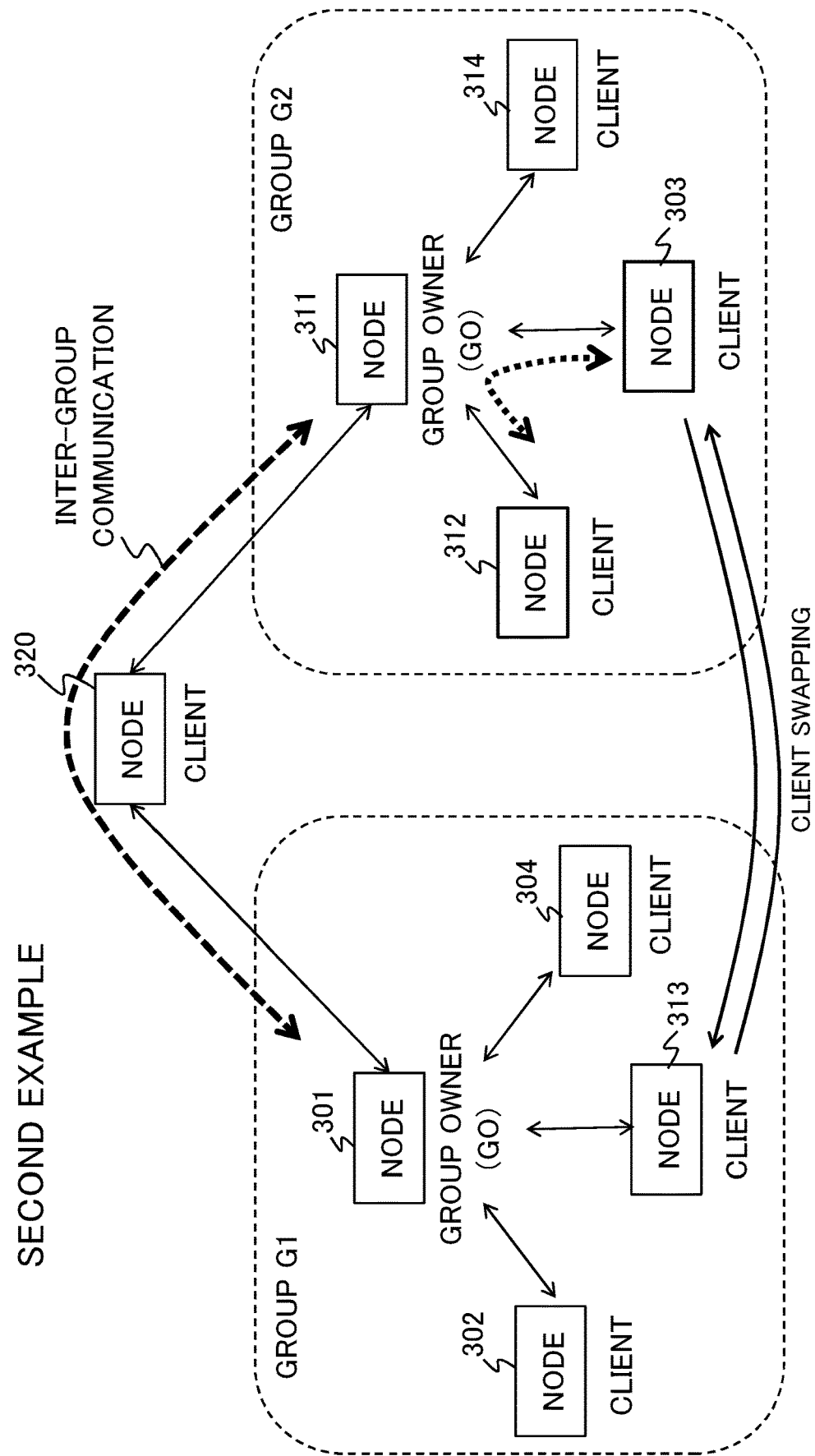
FIG. 6 SECOND EXAMPLE

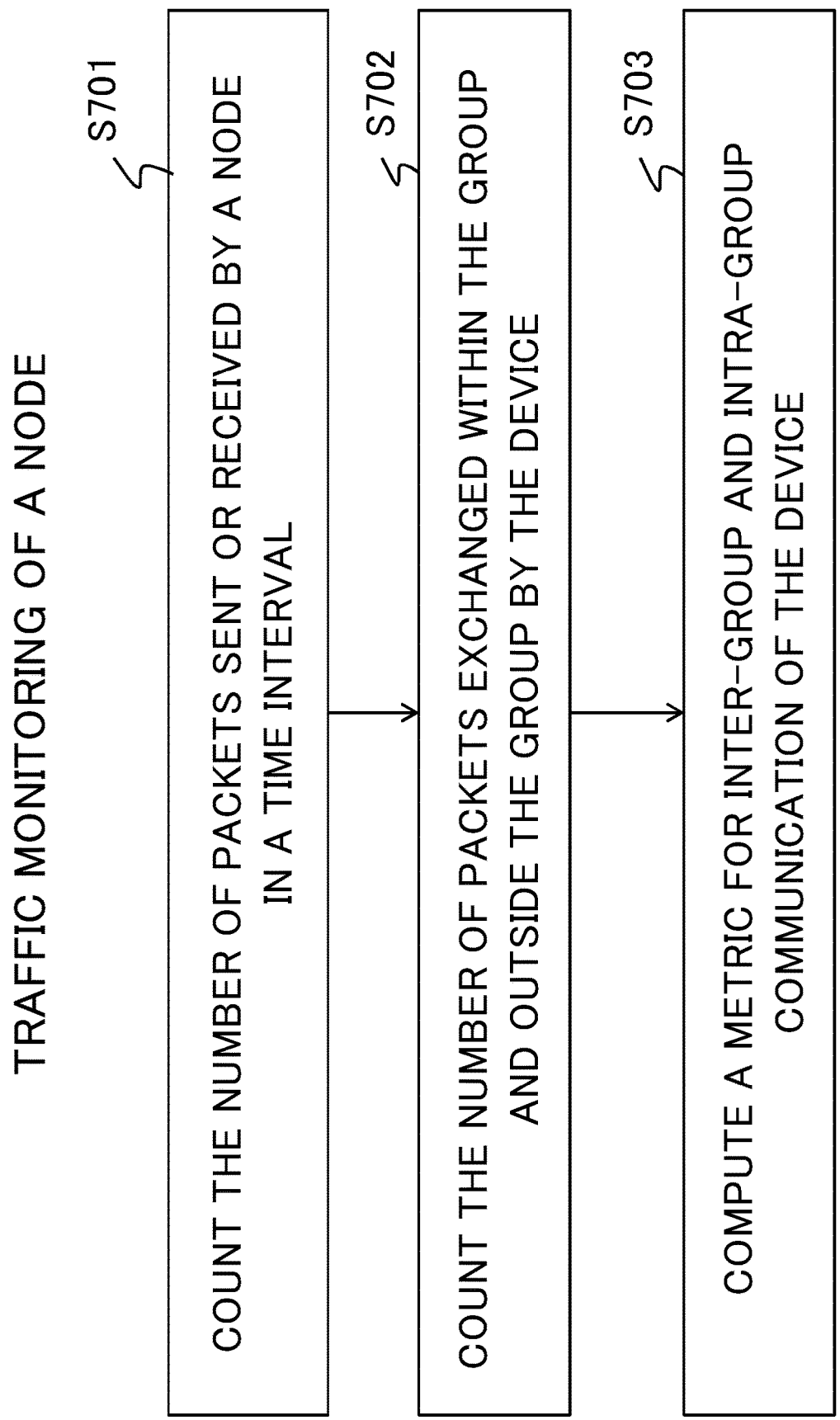

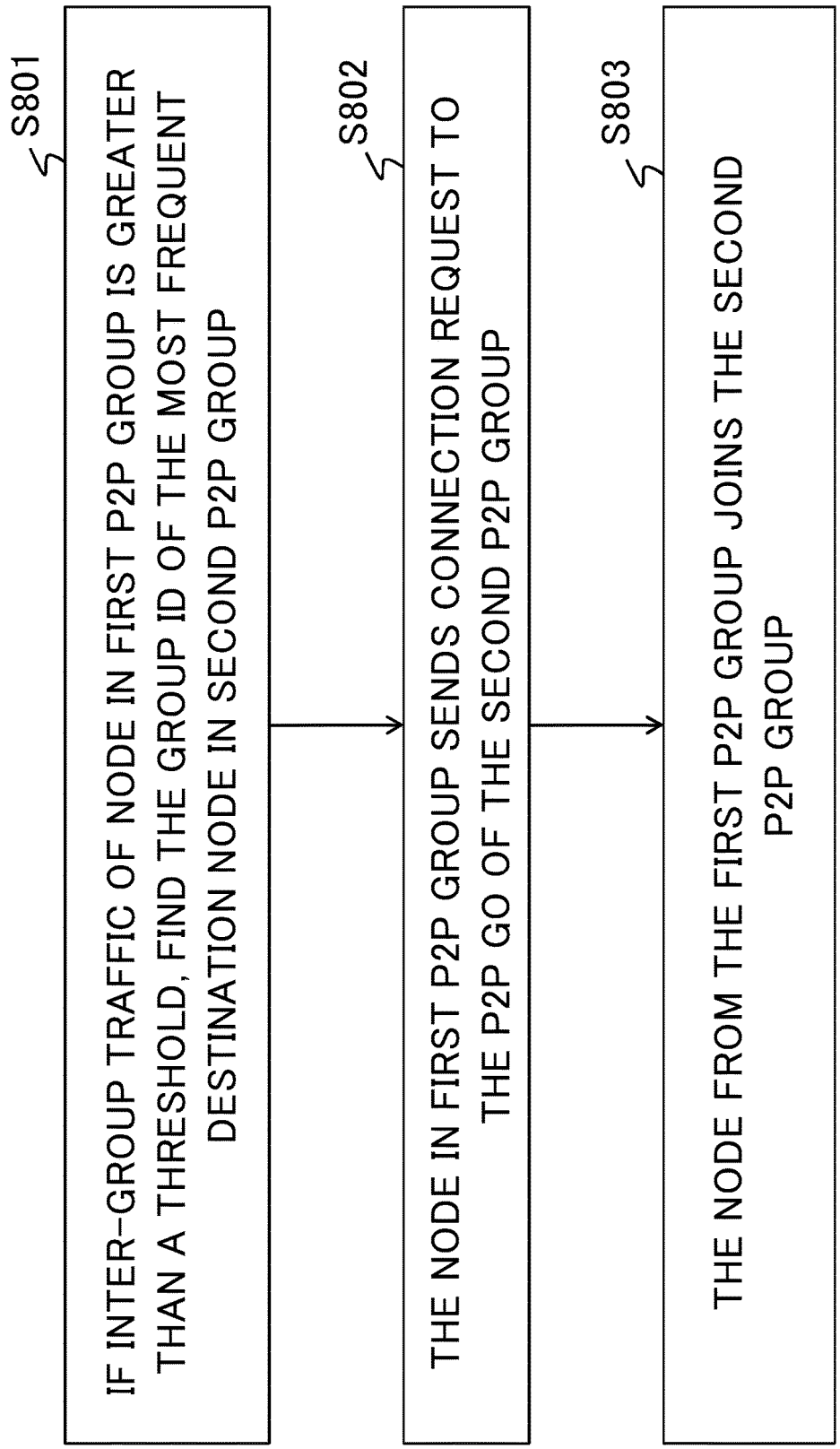

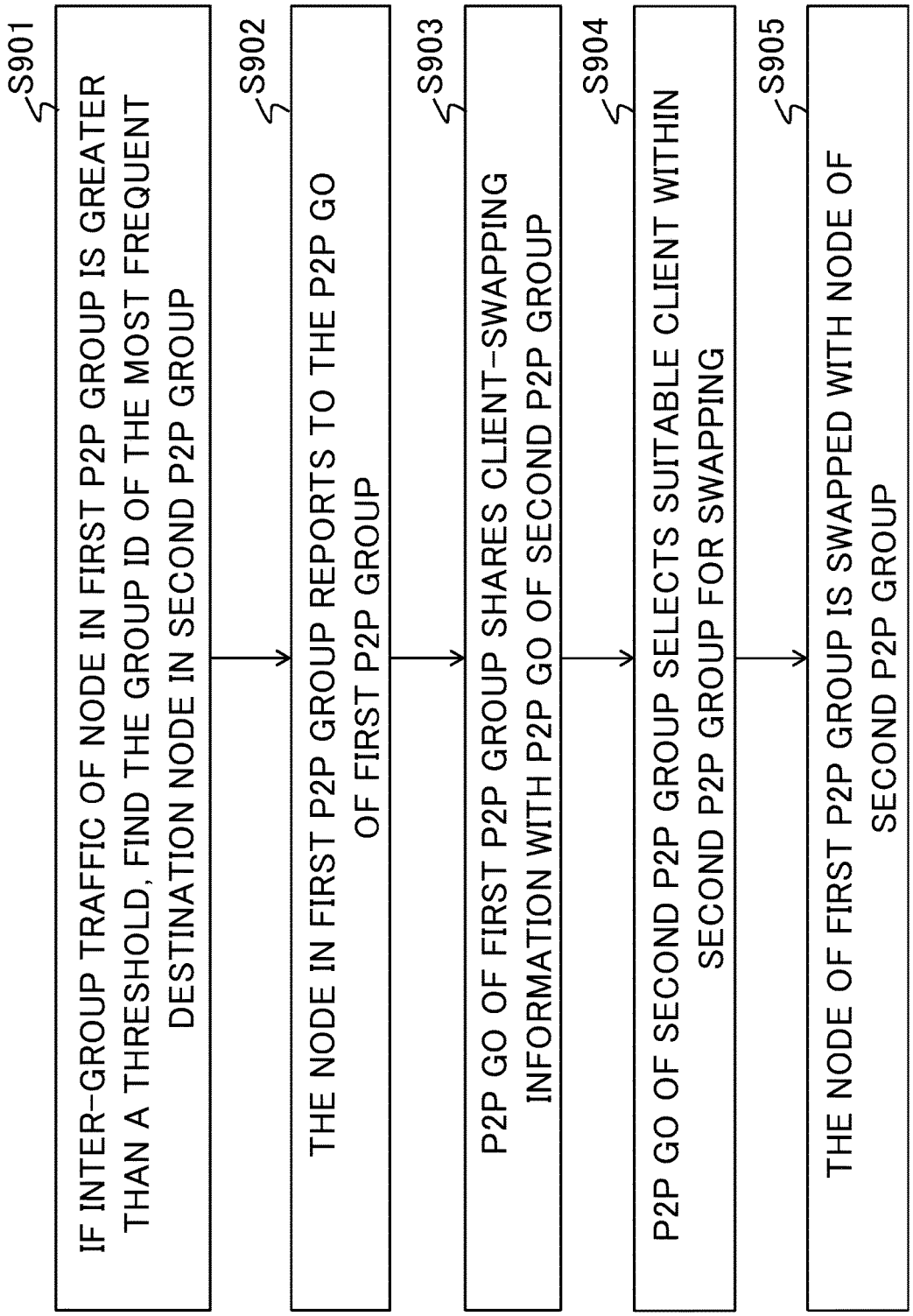

TRAFFIC-AWARE GROUP REFORMATION IN A MULTI-GROUP P2P NETWORK

CROSS REFERENCE TO RELATED APPLICATIONS

This application is a National Stage of International Application No. PCT/JP2015/004483, filed Sep. 3, 2015, the contents of which are incorporated herein by reference in its entirety.

TECHNICAL FIELD

This application generally relates to techniques of communication between devices, in particular to efficient communication techniques in wireless peer-to-peer (P2P) networks.

BACKGROUND ART

In contrast to the traditional infrastructure mode of Wi-Fi, the recently released standard Wi-Fi Peer to peer (P2P), which is also known as Wi-Fi Direct, sheds off the need for a specialized hardware to act as Access Point. Wi-Fi P2P Technical Specification Version 1.4 (NPL1) states the provision that allows any Wi-Fi P2P device to take up the role of P2P Group Owner (analogous to Access Point of Wi-Fi infrastructure mode). Before starting data communication among themselves, a pair of Wi-Fi P2P device discovers each other and negotiates to decide the device that will act as P2P Group Owner (P2P GO). After that a Wi-Fi P2P group is established between the two devices by authentication and association. The P2P GO can then add more devices to its group as P2P Client (analogous to STA in traditional Wi-Fi infrastructure mode). The P2P Clients connect to the P2P GO according to a star topology wherein the P2P GO routes packets from one P2P Client to another.

In this disclosure, a group which has lesser number of Clients than its maximum supportable size (or some other threshold size) is referred to as an unsaturated group. Alternatively, a group with group size equal to the maximum supportable size (or, greater or equal to some threshold size) is referred to as a saturated group.

CITATION LIST

Non Patent Literature

[NPL 1]
Wi-Fi Peer-To-Peer (P2P) Technical Specification Version 1.4

SUMMARY

Technical Problem

Wi-Fi P2P groups may be formed when a Wi-Fi P2P device needs to participate in communication in an ad-hoc manner with another Wi-Fi P2P device. Alternatively, a Wi-Fi P2P Device may randomly join any other active Wi-Fi P2P group that it may discover to get the data shared within that group. But the traffic destinations for such a device may change to some other device outside the group at a later point of time, which may result in degraded network performance.

An object of the present invention is to solve foregoing problem and to provide a mechanism which can achieve enhanced network performance in wireless P2P groups.

Solution to Problem

According to the present invention, a method for group reformation in wireless peer-to-peer (P2P) networks, includes: monitoring traffic of a first device of a first P2P group, the first device communicating with a second device of at least one second P2P group; and altering group formation of the first and second P2P groups so as to put the first device and the second device together in a single P2P group, based on monitored traffic of the first device.

According to the present invention, a wireless device in wireless peer-to-peer (P2P) networks, includes: a monitor configured to monitor traffic of the wireless device of a first P2P group, the wireless device communicating with another device of at least one second P2P group; and a controller configured to alter group formation of the first and second P2P groups so as to put the wireless device and the another device together in a single P2P group, based on monitored traffic of the wireless device.

According to the present invention, a system for group reformation in wireless peer-to-peer (P2P) networks, wherein a first device of a first P2P group monitors traffic thereof communicating with a second device of at least one second P2P group; and a group owner of the first P2P group and a group owner of the second P2P group alter group formation of the first and second P2P groups so as to put the first device and the second device together in a single P2P group, based on monitored traffic of the first device.

Advantageous Effects of Invention

According to the present invention, part of inter-group communication can be transformed to intra-group communication in wireless P2P networks, thus optimizing the network performance by reducing traffic flow outside group.

The invention accordingly comprises the several steps and the relation of one or more of such steps with respect to each of the others, and the apparatus embodying features of construction, combinations of elements and arrangement of parts that are adapted to affect such steps, all is exemplified in the following detailed disclosure, and the scope of the invention will be indicated in the claims.

BRIEF DESCRIPTION OF DRAWINGS

FIG. 6 is a block diagram illustrating client swapping between two wireless P2P groups operating in each other's transmission range in continuation from FIG. 5.

FIG. 7 is a flowchart showing the operation of traffic monitoring according to the exemplary embodiment of the present invention.

FIG. 8 is a flowchart showing a first variant of traffic-aware group reformation according to the exemplary embodiment of the present invention.

FIG. 9 is a flowchart showing a second variant of traffic-aware group reformation according to the exemplary embodiment of the present invention.

DETAILED DESCRIPTION

Figure 1:
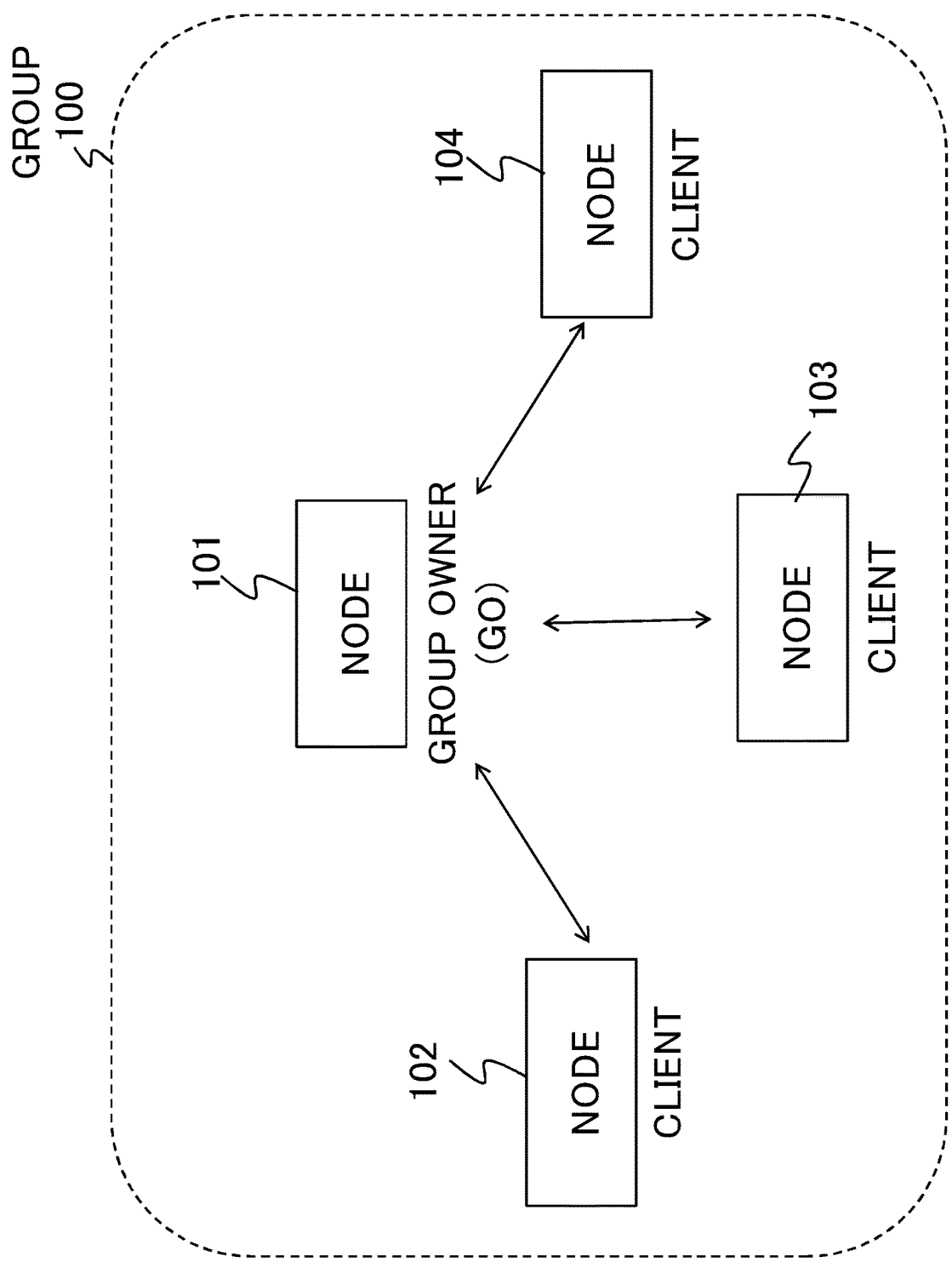
FIG. 1 is a schematic diagram showing a wireless peer-to-peer (P2P) group according to an exemplary embodiment of the present invention.

Hereinafter, the word "exemplary" is used herein to mean "serving as an example, instance or illustration". Any embodiment described herein as "exemplary" is not necessarily to be construed as preferred or advantageous over other embodiments.

1. Outline of Exemplary Embodiments

The conventional technical problems as discussed above can be solved by one or many variants of exemplary embodiments.

According to the exemplary embodiments of the present invention, group topology in a multi-group P2P environment is dynamically changed by putting together a pair of frequently communicating devices (sender-receiver pair) in a single P2P group. More specifically, the traffic flow for a P2P node is monitored to find at least one P2P device outside its own group, with which the P2P node frequently communicates to the extent that the measured traffic exceeds a threshold. Upon finding such an outside P2P Device, a P2P group topology may be dynamically altered to put the pair of frequently communicating devices (the P2P node and the outside P2P Device) together in a single group.

Inter-group communication in multi-group Wi-Fi P2P network may be facilitated by concurrent operation or switching operation. In concurrent operation, a node can maintain simultaneous connection with more than one group by using multiple physical or virtual radio interfaces. Thus, a node performing concurrent operation may route packets from one P2P group to another P2P group which enables inter-group communication. In switching operation, a P2P Client from a first P2P group may disconnect from the first P2P GO, connect to a second P2P GO, transfer data packets and may return back to the first group. Quite understandably, a multi-group Wi-Fi P2P network with high inter-group traffic is not very efficient.

A mechanism that can analyze traffic pattern of each device and dynamically reform the topology accordingly, may optimize a multi-group P2P network. Concurrent operation requires a device to support multiple physical or virtual MAC entities while switching operation requires a switching device to perform repeated connection and disconnection between two or more P2P groups. Also, a packet destined to a node outside group domain may have to be forwarded over multiple groups before reaching the final destination which increases the delay.

According to the exemplary embodiments, frequently communicating nodes are brought into the same P2P group by dynamic topology reformation so as to transform inter-group traffic into intra-group traffic.

Accordingly, a method for measuring the traffic destinations of a P2P GO or P2P Client in a Wi-Fi P2P group is used to find at least one outside node (Wi-Fi P2P GO or Client outside its own group) which frequently communicates with the inside P2P node such that the number of packets destined for that outside node exceeds a predefined threshold. Such monitoring of recent traffic may be performed by the nodes themselves. In such a method, a device may measure the number of packets it sends or receives outside its native group. If the measure exceeds a predefined threshold, then such a node's traffic pattern may be analyzed to check if there is at least one destination node outside group domain with whom it prefers to communicate. If such a destination is found, then the node may request its native P2P GO to move to the group of the most frequent destination. Alternatively, the traffic monitoring can also be performed by the P2P GO for each device in its group. Since a P2P GO is responsible for routing of packets transmitted by its associated Clients, it can monitor the packet destinations of all packets being routed by it. If any Client is found to be communicating frequently with another node outside the group, then the client may be sent to the P2P group of the outside node. Thus, a method will be used to bring the sender-receiver pair to the same group so that inter-group traffic can be translated to intra-group traffic.

There may be used many variants of a method adopted to switch the first client device from the first P2P group to the second P2P group. If a first P2P group has a client device which frequently communicates with a device in a second P2P group, then the client device can be switched from the first P2P group to the second P2P group. As another method, the first P2P group and second P2P group may engage in a client-swapping process so as to bring the frequent communicators in the same group. More specifically, when the client device is sent from the first P2P group to the second P2P group, a client can be switched from the second P2P group to the first P2P group. The client in the second P2P group which is swapped with the client in the first P2P group may be chosen from a set of clients in the second group excluding the destination node of the first client device, such that it has intra-group communication lesser frequently than a threshold. Thus the second P2P group may agree to release a client device such that it does not lose a frequent intra-group communicator.

The intra-group communication metric of a device may be computed as a ratio of the number of packets sent or received by the device within the group to the total number of packets sent or received by that device in a given time interval. Similarly, the inter-group communication metric can also be computed as a ratio of the number of packets sent or received by the device from another device outside the group to the total number of packets sent or received by that device in a given time interval.

In some other variants of the method explained above, the group owner device of the first P2P group may exchange information with the group owner device of the second P2P group prior to sending the client device from first P2P group to the second P2P group. Such information may include request and confirmation of the client transfer event. Such information may also include the information about security credentials required to join second P2P group by invitation. Thus by using invitation mechanism, the time required to connect to the second group can be further reduced. A P2P group may look to client swapping as long as it does not achieve a minimum value of intra-group communication. Thus by performing client-swapping iteratively, it will be possible to converge to a group structure where each P2P group can be clustered on the basis of traffic history.

If the number of devices that frequently communicates with each other is greater than the permissible group size of the second P2P group, then they may be connected to two or more neighboring groups with minimum number of intermediate hops in between them.

According to the exemplary embodiments of the present invention, it will be possible to optimize inter-group communication by improving intra-group communication. Nodes which are part of the same P2P group can communicate with each other more easily than with a node outside the group. Inter-group communication mechanisms resort to concurrent node operation or switching nodes between multiple groups. As explained before, concurrent operation requires a node to possess multiple physical or virtual MAC entities. On the other hand, switching devices have to iteratively switch connection between multiple groups which may increase load on the group owner device of a P2P group. Intra-group communication is very efficient with less end-to-end delay as all clients are only two-hop away from each other, being connected through the group owner device. By placing frequently communicating nodes in the same P2P group, a multi-group P2P network can be reformed dynamically into a network of traffic-aware-groups. Lesser inter-group communication will lead to requirement of less switching devices for inter-group switching. Accordingly, efficient end-to-end data delivery and minimum delay can be achieved.

2. Examples

Hereinafter, several examples of the exemplary embodiment of the present invention will be described according to W-Fi Direct Standard as an example. However, this disclosure may also hold for any other wireless P2P communication method without loss of generality. The examples are discussed in its complete details with accompanying figures and finally explained with a typical example scenario.

2.1) System Configuration

FIG. 1 illustrates an exemplary Wi-Fi Direct group 100. In the group 100, the node 101 operates as a Group Owner (GO) and other nodes 102-104 operate as associated Clients, respectively. Once group 100 is formed, the GO node 101 plays a role analogous to that of an access point in a Wi-Fi infrastructure mode operation.

Figure 2:
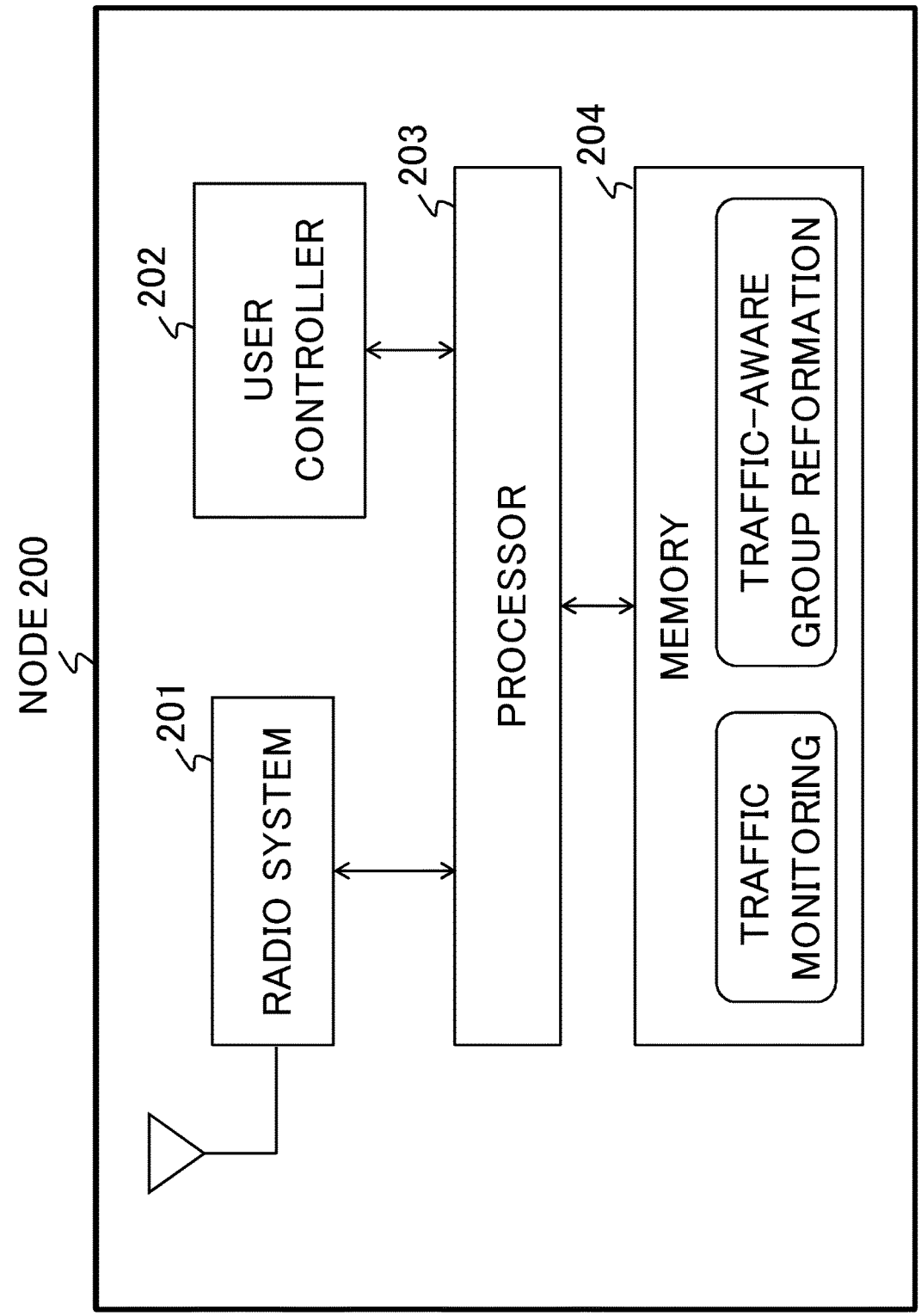
FIG. 2 is a block diagram showing the functional configuration of a node according to an exemplary embodiment of the present invention.

FIG. 2 shows a schematic block diagram of a device (node 200) used to perform communications in a Peer to Peer group according to one or more embodiments of the present invention. The node 200 represents any one of the nodes 101-104 which have the same configuration but may operate as GO or Client. In various implementations, the device or node 200 may be a personal computing device (e.g., smart phones, computing tablets, personal computers, laptops, Personal Digital Assistants (PDAs), etc.) capable of Peer to Peer communication.

Referring to FIG. 2, the node 200 includes the following functionalities: a radio system 201, a user controller 202, a processor 203 and a memory 204. The radio system 201 includes a Wi-Fi Direct communication function. The user controller 202 controls Wi-Fi Direct connection procedures such as Device Discovery, GO Negotiation, Provisional Service Discovery and Invitation Mechanism etc. The processor 203 can execute the operating system and applications stored in the memory 204 or a separate storage device such as a semiconductor memory according to the present example. The applications stored in the memory 204 implements various functions including traffic monitoring and traffic-aware group reformation, which will be described later.

The memory 204 may include a system memory component (e.g, RAM), a static storage component (e.g., ROM), and/or a disk drive. The node 200 performs specific operations by processor 203 and other components by executing one or more sequences of instructions contained in the system memory component. Logic may be encoded in a computer readable medium, which may refer to any medium that participates in providing instructions to processor 203 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component, and transmission media includes coaxial cables, copper wire, and fiber optics, including wires that comprise bus. In one example, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, Compact Disc (CD) Read-Only Memory (ROM), any other optical medium, punch cards, paper tape, any other physical medium with patterns of holes, Random-Access Memory (RAM), Programmable ROM (PROM), Electrically Erasable Programmable ROM (EEPROM), FLASH-EEPROM, any other memory chip or cartridge, or any other medium from which a computer is adapted to read.

2.2) First Example of Operation

Figure 3:
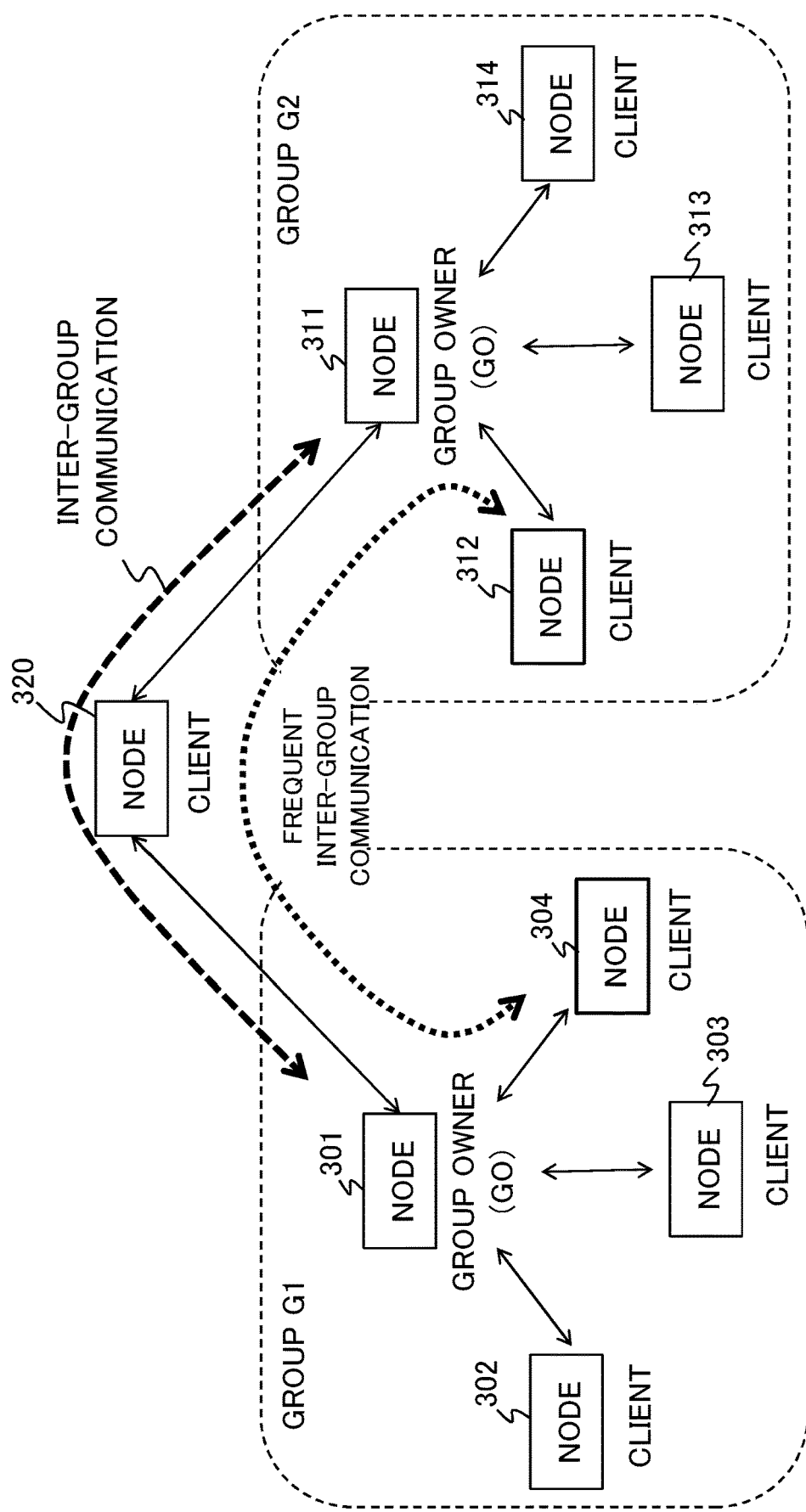
FIG. 3 is a block diagram showing two wireless P2P groups operating in each other's transmission range according to a first example of the exemplary embodiment of the present invention.

FIG. 3 shows two Wi-Fi P2P groups G1 and G2 operating in each other's transmission range. Node 301 acts as the P2P GO of the group G1. Nodes 302, 303 and 304 are P2P Clients of the group G1 connected to the P2P GO 301. Node 311 acts as the P2P GO of the group G2. Nodes 312, 313 and 314 are P2P Clients of the group G2 connected to the P2P GO 311. Node 320 is a switching node that operates as a P2P Client of the group G1 by connecting to P2P GO 301 and also as a P2P Client of the group G2 by connecting to P2P GO 311 in a time-sharing manner. Thus, data packets are exchanged between the groups G1 and G2 using the switching node 320 for inter-group communication.

In this example, as shown in FIG. 3, it is assumed that the node 304 frequently exchanges data packets with the node 312 through the node 320. Since the nodes 304 and 312 are in different groups, their communication rate is dependent on the switching frequency of the node 320. A higher switching frequency of the node 320 increases processing load on the P2P GO 301 and the P2P GO 311. Also, to support a higher traffic requirement between the nodes 304 and 312, a higher number of switching devices may be deployed. The node 304 in the Group G1 monitors the traffic destinations of the packets sent or received by itself and reports to the P2P GO 301 when the number of packets exchanged with a node outside the group G1 exceeds a predefined threshold. Alternatively, the P2P GO 301 may also monitor the destination of the packets exchanged by the node 304. Similarly, the node 312 monitors the traffic destinations of the packets sent or received by itself and reports to the P2P GO 311 when the number of packets exchanged with a node outside the group G2 exceeds a predefined threshold. Alternatively, the P2P GO 311 may also monitor the destination of the packets exchanged by the node 312.

Figure 4:
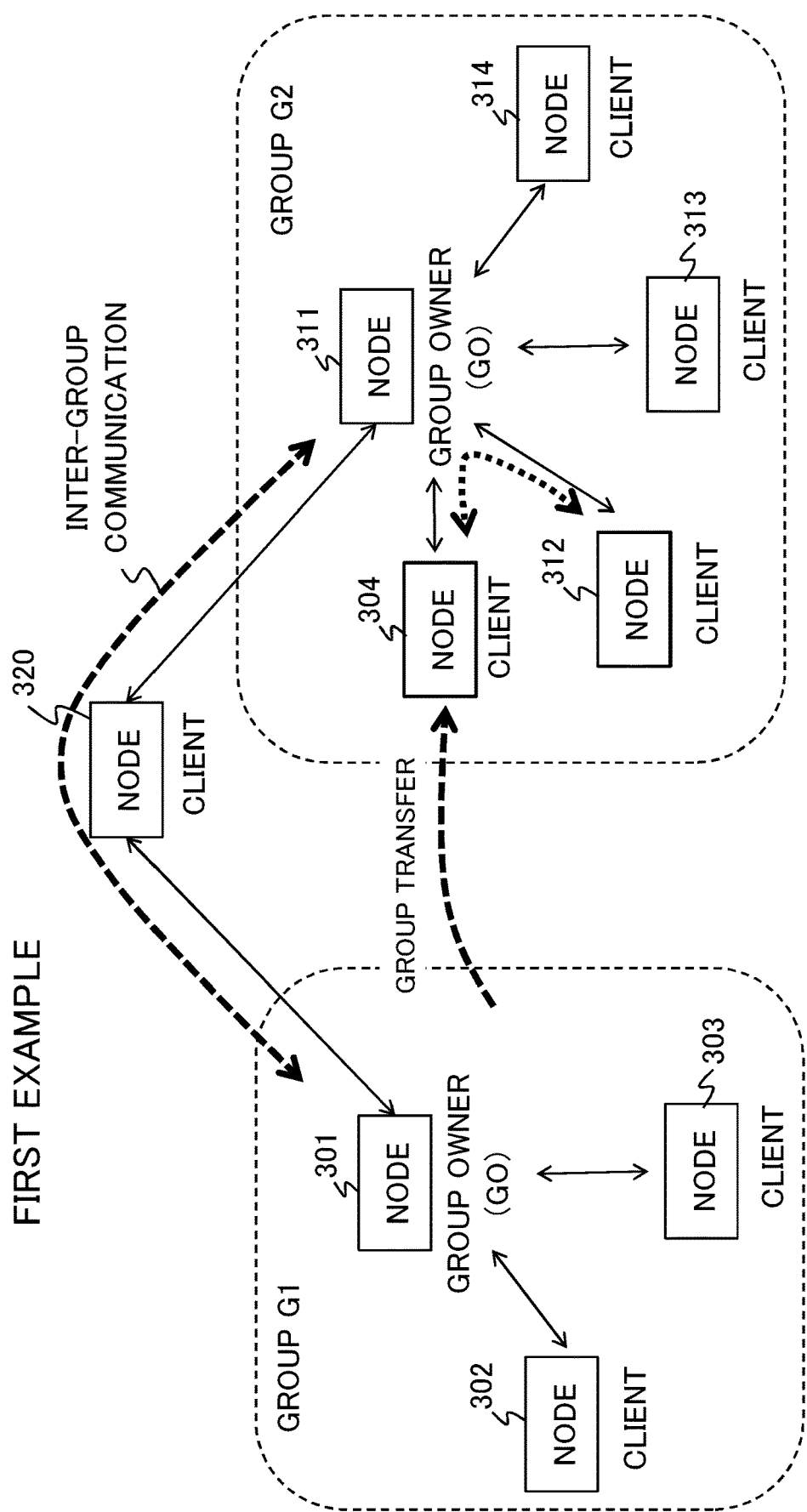
FIG. 4 is a block diagram illustrating client transfer between two wireless P2P groups operating in each other's transmission range in continuation from FIG. 3.

FIG. 4 shows two Wi-Fi P2P groups operating in each other's transmission range in continuation of the example described in FIG. 3. Since the traffic of the node 304 for a destination outside the group G1 exceeded the predefined threshold, the node 304 is transferred from the group G1 to the group G2 of its frequently communicating destination node 312. Since the groups G1 and G2 are operating in each other's transmission range, the node 304 can perform group transfer by disconnecting from the P2P GO 301 and connecting with the P2P GO 311. Thus, the node 304 becomes a member of the same group, resulting in that the communication between the nodes 304 and 312 is no longer dependent on a switching device node 320. Thus, the frequent communication between the nodes 304 and 312 is transformed from inter-group communication as shown in FIG. 3 to intra-group communication as shown in FIG. 4.

2.3) Second Example of Operation

Figure 5:
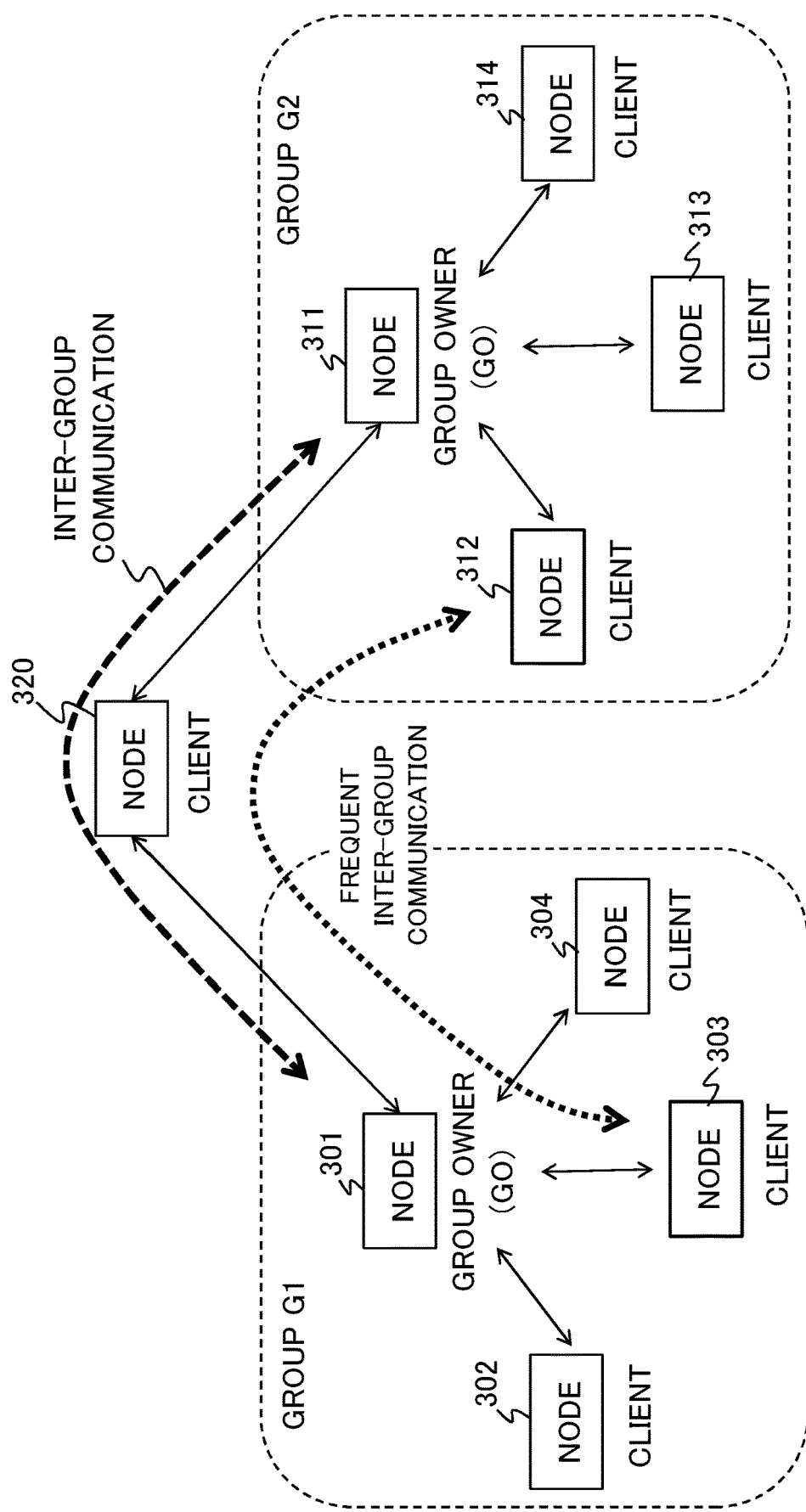
FIG. 5 is a block diagram showing two wireless P2P groups operating in each other's transmission range according to a second example of the exemplary embodiment of the present invention.

FIG. 5 shows another example concerning two Wi-Fi P2P groups operating in each other's transmission range. The group structure and topology are the same as shown in FIG. 3 and their details will be omitted.

In this example, as shown in FIG. 5, it is assumed that the node 303 frequently exchanges data packets with the node 312. Since the nodes 303 and 312 are in different groups, their communication rate is dependent on the switching frequency of the node 320. The node 303 monitors the traffic destinations of the packets sent or received by itself and reports to the P2P GO 301 when the number of packets exchanged with a node outside the group G1 exceeds a predefined threshold. Alternatively, the P2P GO 301 may also monitor the destination of the packets exchanged by the node 303. Similarly, the node 312 monitors the traffic destinations of the packets sent or received by itself and reports to the P2P GO 311 when the number of packets exchanged with a node outside the group G2 exceeds a predefined threshold. Alternatively, the P2P GO 311 may also monitor the destination of the packets exchanged by the node 312.

It is assumed that the node 313 is a P2P Client in the group G2 such that the number of intra-group packets exchanged by the node 313 is lower than a predefined threshold. Thus, the node 313 does not contribute much to the intra-group communication within the group G2. Accordingly, in such a case, the node 303 can swap groups with the node 313.

As shown in FIG. 6, two Wi-Fi P2P groups G1 and G2 operate in each other's transmission range in continuation of the example described in FIG. 5. Since the traffic of the node 303 for a destination outside the group G1 exceeded the predefined threshold, the node 303 is transferred to the group G2 of its frequently communicating destination node 312. In this example, this group transfer is done by swapping the groups of the node 303 and the node 313. Since the groups G1 and G2 are operating in each other's transmission range, the node 303 can perform group transfer by disconnecting from the P2P GO 301 and connecting with the P2P GO 311 and similarly the node 313 can perform group transfer by disconnecting from the P2P GO 311 and connecting with the P2P GO 301. Thus, the node 303 becomes a member of the same group and therefore the communication between the nodes 303 and 312 is no longer dependent on the switching device (node 320). Also, since it is reported that the node 313 has minimal intra-group communication within the group G2, transferring it to the group G1 did not hurt intra-group communication within the group G2. The advantage of this client-swapping process is that even saturated groups can participate in this as vacancy in client position is created during the swapping process, thus no prior vacant position in group is required before initiating the swapping process.

2.4) Traffic Monitoring

FIG. 7 shows a flowchart explaining the mechanism of monitoring traffic of a node in a P2P group. The traffic monitoring is performed by the processor 203 running the traffic monitoring application as shown in FIG. 2. At first, the number of packets sent or received by a node in a particular time interval may be counted by the node itself or the P2P GO of that group (Operation S701). Then the number of packets exchanged by that node within the group and outside the group is counted (Operation S702). Then some metrics can be calculated to quantify the intra-group and inter-group message exchange of the node respectively (Operation S703). Exemplary metric to quantify intra-group communication may be computed by taking a ratio of the number of packets exchanged by a node within the group in a particular interval of time to the total number of packets exchanged by the node in the particular interval of time. Similarly, exemplary metric to quantify inter-group communication may be computed by taking ratio of the number of packets exchanged by a node outside the group in a particular interval of time to the total number of packets exchanged by the node in the particular interval of time.

2.5) Traffic-Aware Group Reformation (Variant 1)

FIG. 8 shows a flowchart explaining one exemplary mechanism of traffic-aware group reformation among two or more P2P groups. When the inter-group traffic of a node in first P2P group exceeds a threshold, the most frequent communication destination of the first node is decided by monitoring the packet destinations of the sent and received packets by the first node. Then the group ID of the destination node is extracted as a second P2P group from the destination node information (Operation S801). A connection request is then sent by the first node to the P2P GO of the second P2P group (Operation S802) and the first node joins the second P2P group (Operation S803).

2.6) Traffic-Aware Group Reformation (Variant 2)

FIG. 9 shows a flowchart explaining another exemplary mechanism of traffic-aware group reformation among two or more P2P groups. When the inter-group traffic of a node in first P2P group exceeds a threshold, the most frequent communication destination of the first node is decided by monitoring the packet destinations of the sent and received packets by the first node. Then the group ID of the destination node is extracted as a second P2P group (Operation S901). This destination group ID information is then reported to the P2P GO of the first P2P group (Operation S902). P2P GO of the first group shares Client-Swapping information with the P2P GO of the second group (Operation S903). Such sharing of information may be done by various mechanisms including, but not limited to, sending Probe Request, Probe Response, Beacon, Service Discovery Query, Service Discovery Response, Invitation Request, Invitation Response or using concurrent operation or through a switching node. This may be performed by including client-transfer or client-swapping request or response information in the Vendor-Specific Content field of at least one of Probe Request, Probe Response, Beacon, Service Discovery Query, Service Discovery Response, Invitation Request, Invitation Response frames. For example, if Service Discovery Query and Response frames are used, then client-transfer or client-swapping request related information may be included in the Vendor-Specific content field of the Service Discovery Query frame from a node in the first P2P group. After receiving the Service Discovery Query frame, a node in the second P2P group may respond with a Service Discovery Response frame by including the client-transfer or client-swapping response related information in the Vendor-Specific content field of the Service Discovery Response frame. The Service Discovery Query frame specified in Wi-Fi P2P technical specification uses the GAS Initial Request action frame; Service Discovery Response frame specified in Wi-Fi P2P technical specification uses the GAS Initial Response Action frame. However, as already mentioned, the Client-transfer or Client Swapping request and response frames may be exchanged between a first P2P group and a second P2P group by many other mechanisms. For example, a switching client that performs switching operation between a first P2P group and a second P2P group may transfer the messages between the two groups. Alternatively, in concurrent operation, a node that simultaneously operates as member of a first P2P group and a second P2P group may transfer the client-transfer or client-swapping requests and response between the two groups.

In some variants of the exemplary embodiment, a security credential (for example, a security key) may be exchanged between first P2P group and second P2P group prior to client-transfer or client-swapping so that client transfer or client swapping may be done using P2P invitation mechanism, thus reducing the disruption time during the transfer or swapping process. This method may require sharing of security related credentials necessary for creating persistent session history. Such credentials may be shared before client transfer or client swapping between first P2P group and second P2P group. After receiving the credentials, the client of first P2P group that has to be transferred or swapped to a second P2P group may create a persistent session history with the Wi-Fi P2P GO of the second P2P group who also creates persistent session history. After that, the client disconnects from first P2P group and connects to second P2P GO by P2P Invitation.

When receiving Client-Swapping request from a first P2P group, the P2P GO of the second P2P group may search the second P2P group for a suitable node (P2P Client or P2P GO) and, if such a suitable node is found, the P2P GO of the second P2P group may agree on Client-Swapping (Operation S904). Such a suitable node within the second P2P group may be a node which has reported high inter-group communication with another node in the first P2P group (excepting the destination node of the node in first P2P group that requested client swapping with the second P2P group) or a node which has reported intra-group communication below a threshold. If the former node is not found, then the P2P GO of the second group may search the second P2P group for the latter node. When the P2P GO of the second P2P group agrees on the Client-Swapping, the swapping of two nodes between the first P2P group and the second P2P group is performed (Operation S905).

3. Other Modifications

Where applicable, various embodiments of the present invention may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Application software in accordance with the exemplary embodiment, such as computer programs executed by the device and may be stored on one or more computer readable mediums. It is also contemplated that the steps identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although embodiments of the present invention have been described, these embodiments illustrate but do not limit the disclosure. For example, the word "device" may define Group Owner, Client, or P2P device connectable to a group but not connected to any group.

It should also be understood that embodiments of the present invention should not be limited to these above-described embodiments but that numerous modifications and variations may be made by one of ordinary skill in the art in accordance with the principles of the present invention and be included within the spirit and scope of the present invention as hereinafter claimed.

The above exemplary embodiments of the present invention can be applied to wireless peer-to-peer (P2P) networks.

4. Supplementary Note

The whole or part of the exemplary embodiments disclosed above can be described as, but not limited to, the following supplementary notes.
(Supplementary Note 1)
A method comprising:
monitoring the traffic of at least one device in a Peer To Peer (P2P) group and
switching a device from a first P2P group to a second P2P group based on the result of traffic monitoring.
(Supplementary Note 2)
The method according to Supplementary note 1, wherein the number of incoming packets to the device and outgoing packets from the device are counted.
(Supplementary Note 3)
The method according to Supplementary note 1 or 2, wherein the number of packets received by the device in first P2P group from a device in second P2P group and the number of packets sent by the device in first P2P group to a device in second P2P group is counted.
(Supplementary Note 4)
The method according to Supplementary note 1 or 2 or 3, wherein the device in first P2P group may be switched to the second P2P group if the number of incoming and outgoing packets of the device in first P2P group from or to a device in the second P2P group is greater than the number of incoming and outgoing packets of the device in first P2P group from or to a device in the first P2P group.

(Supplementary Note 5)

The method according to Supplementary note 1, wherein the monitoring of incoming and outgoing packets of a device in the first P2P group may be performed by the device itself.

(Supplementary Note 6)

The method according to Supplementary note 1, wherein the monitoring of incoming and outgoing packets of a device in the first P2P group may be performed by the owner device of the first P2P group.

(Supplementary Note 7)

The method according to Supplementary note 1 or 2 or 5 or 6, wherein the number of incoming and outgoing packets from a device in the first P2P group may be counted for an interval of time to decide if it should be switched to the second P2P group.

(Supplementary Note 8)

The method according to Supplementary note 1 or 2 or 5 or 6 or 7, wherein the number of incoming and outgoing packets from a device in the first P2P group may be compared with a predefined threshold to decide if it should be switched to the second P2P group.

(Supplementary Note 9)

The method according to Supplementary note 1 wherein if the device in the first P2P group exchanges a number of packets with multiple groups such that the number of packets is greater than a predefined threshold, then the device may be switched to that P2P group with which it exchanges maximum number of packets.

(Supplementary Note 10)

The method according to Supplementary note 1 wherein if the number of devices that frequently communicates with each other, such that their number of exchanged packets is greater than a predefined threshold, is greater than the permissible group size of a single P2P group, then they may be connected to neighboring groups with minimum number of intermediate hops in between them.

(Supplementary Note 11)

The method according to Supplementary note 1 or 9, wherein the first P2P group and the second P2P group may swap at least one pair of device.

(Supplementary Note 12)

The method according to Supplementary note 1 or 9, wherein the first P2P group and the second P2P group may swap at least one pair of device.

(Supplementary Note 13)

The method according to Supplementary note 1 wherein a pair of devices who frequently communicate with each other are placed in the same P2P group.

(Supplementary Note 14)

The method wherein a device from a first P2P group disconnects from the first P2P group and joins a second P2P group to meet the instantaneous traffic requirements.

5. Other Supplementary Note

The whole or part of the exemplary embodiments disclosed above can be described as, but not limited to, the following other supplementary notes.

(Supplementary Note 1)

A method for group reformation in wireless peer-to-peer (P2P) networks, comprising:

monitoring traffic of a first device of a first P2P group, the first device communicating with a second device of at least one second P2P group; and altering group formation of the first and second P2P groups so as to put the first device and the second device together in a single P2P group, based on monitored traffic of the first device.

(Supplementary Note 2)

The method according to Supplementary note 1, wherein when the monitored traffic of the first device exceeds a predetermined threshold, the first device is switched from the first P2P group to the second P2P group.

(Supplementary Note 3)

The method according to Supplementary note 1 or 2, wherein when inter-group traffic of the first device between the first and second P2P groups is greater than intra-group traffic of the first device within the first P2P group, the first device is switched from the first P2P group to the second P2P group.

(Supplementary Note 4)

The method according to any one of Supplementary notes 1-3, wherein the traffic of the first device is monitored by counting packets communicated with the second device.

(Supplementary Note 5)

The method according to any one of Supplementary notes 1-4, wherein the first device communicating with multiple second P2P groups is switched to one of the multiple second P2P groups with which the first device exchanged maximum number of packets.

(Supplementary Note 6)

The method according to any one of Supplementary notes 1-5, wherein if the number of members of the second P2P group is greater than or equal to a permissible size of the second P2P group, the first device is connected to a neighboring group of the second P2P group with minimum number of intermediate hops from the second P2P group.

(Supplementary Note 7)

The method according to Supplementary note 1, wherein the first P2P group and the second P2P group swap at least one pair of devices including the first device of the first P2P group and a third device of the second P2P group, wherein the third device is a device having inter-group traffic greater than a predetermined threshold with another device of the first P2P group or a device having intra-group traffic lower than a predetermined threshold.

(Supplementary Note 8)

The method according to Supplementary notes 1-7 wherein the first device disconnects from the first P2P group and joins the second P2P group to meet the instantaneous traffic requirements.

(Supplementary Note 9)

The method according to Supplementary notes 1-8, wherein a security credential is shared between the first P2P group and the second P2P group so as to enable transfer of client between first P2P group and second P2P group by invitation mechanism.

(Supplementary Note 10)

The method according to any one of Supplementary notes 1-9 wherein the first P2P group and second P2P group communicate about client transfer using a switching node that switches connection between the first P2P group and the second P2P group.

(Supplementary Note 11)

The method according to any one of Supplementary notes 1-9 wherein the first P2P group and second P2P group communicate about client transfer using a concurrent node that maintains simultaneous connection between the first P2P group and the second P2P group using more than one physical or virtual network interfaces.

(Supplementary Note 12)

The method according to any one of Supplementary notes 1-9 wherein the first P2P group and second P2P group communicate about client transfer using at least one of: a Probe Request frame, a Probe Response frame, a beacon frame, a Service Discovery Query frame, a Service Discovery Response frame, a P2P Invitation Request frame or a P2P Invitation Response frame.

(Supplementary Note 13)

A wireless device in wireless peer-to-peer (P2P) networks, comprising:

a monitor configured to monitor traffic of the wireless device of a first P2P group, the wireless device communicating with another device of at least one second P2P group; and a controller configured to alter group formation of the first and second P2P groups so as to put the wireless device and the another device together in a single P2P group, based on monitored traffic of the wireless device.

(Supplementary Note 14)

The wireless device according to Supplementary note 13, wherein the controller switches the wireless device from the first P2P group to the second P2P group when the monitored traffic of the wireless device exceeds a predetermined threshold.

(Supplementary Note 15)

The wireless device according to Supplementary note 13 or 14, wherein the controller switches the wireless device from the first P2P group to the second P2P group when inter-group traffic of the wireless device between the first and second P2P groups is greater than intra-group traffic of the wireless device within the first P2P group.

(Supplementary Note 16)

The wireless device according to any one of Supplementary notes 13-15, wherein the monitor monitors the traffic of the wireless device by counting packets communicated with the another device.

(Supplementary Note 17)

The wireless device according to any one of Supplementary notes 13-16, wherein the controller switches the wireless device communicating with multiple second P2P groups to a maximum-traffic one of the multiple second P2P groups.

(Supplementary Note 18)

The wireless device according to any one of Supplementary notes 13-17, wherein the controller controls such that the wireless device is connected to a neighboring group with minimum number of intermediate hops from the second P2P group if the number of members of the second P2P group is greater than a permissible size of the second P2P group.

(Supplementary Note 19)

The wireless device according to Supplementary note 13, wherein a group owner of the first P2P group and a group owner of the second P2P group swap at least one pair of devices including the wireless device of the first P2P group and a suitable device of the second P2P group, wherein the suitable device is a device having inter-group traffic greater than a predetermined threshold with another device of the first P2P group or a device having intra-group traffic lower than a predetermined threshold.

(Supplementary Note 20)

The wireless device according to Supplementary notes 13-19 wherein the wireless device disconnects from the first P2P group and joins the second P2P group to meet the instantaneous traffic requirements.

(Supplementary Note 21)

A system for group reformation in wireless peer-to-peer (P2P) networks, wherein a first device of a first P2P group monitors traffic thereof communicating with a second device of at least one second P2P group; and a group owner of the first P2P group and a group owner of the second P2P group alter group formation of the first and second P2P groups so as to put the first device and the second device together in a single P2P group, based on monitored traffic of the first device.

REFERENCE SIGNS LIST

100 Group
101-104, 301-304, 311-314 Node
201 Radio system
202 User controller
203 Processor
204 Memory

The invention claimed is:

1. A method for group reformation in wireless peer-to-peer (P2P) networks, comprising:

monitoring traffic of a first device of a first P2P group, the first device communicating with a second device of at least one second P2P group; and altering group formation of the first and second P2P groups so as to put the first device and the second device together in a single P2P group, based on monitored traffic of the first device including inter-group traffic of the first device, wherein the altering comprises swapping, by the first P2P group and the second P2P group, at least one pair of devices including the first device of the first P2P group and a third device of the second P2P group, wherein the third device is a fourth device having inter-group traffic greater than a first predetermined threshold with another device of the first P2P group or the third device is a fifth device having intra-group traffic lower than a second predetermined threshold.

2. The method according to claim 1, wherein the monitored inter-group traffic of the first device between the first and second P2P groups exceeds a predetermined threshold.

3. The method according to claim 1, wherein inter-group traffic of the first device between the first and second P2P groups is greater than intra-group traffic of the first device within the first P2P group.

4. The method according to claim 1, wherein the traffic of the first device is monitored by counting packets communicated with the second device.

5. The method according to claim 1, wherein the first device exchanged maximum number of packets with the second P2P group.

6. The method according to claim 1, wherein the altering group formation is based on meeting instantaneous traffic requirements.

7. The method according to claim 1, wherein a security credential is shared between the first P2P group and the second P2P group so as to enable transfer of client between first P2P group and second P2P group by invitation mechanism.

8. The method according to claim 1, wherein the first P2P group and second P2P group communicate about client transfer using a switching node that switches connection between the first P2P group and the second P2P group.

9. The method according to claim 1, wherein the first P2P group and second P2P group communicate about client transfer using a concurrent node that maintains simultaneous connection between the first P2P group and the second P2P group using more than one physical or virtual network interfaces.

10. The method according to claim 1, wherein the first P2P group and second P2P group communicate about client transfer using at least one of: a Probe Request frame, a Probe Response frame, a beacon frame, a Service Discovery Query frame, a Service Discovery Response frame, a P2P Invitation Request frame or a P2P Invitation Response frame.

11. A wireless device in wireless peer-to-peer (P2P) networks, comprising:
   a monitor configured to monitor traffic of the wireless device of a first P2P group, the wireless device communicating with another device of at least one second P2P group; and
   a controller configured to alter group formation of the first and the one second P2P groups so as to put the wireless device and the another device together in a single P2P group, based on monitored traffic of the wireless device including inter-group traffic of the wireless device,
   wherein the controller is configured to alter group formation by swapping, by the first P2P group and the one second P2P group, at least one pair of devices including the wireless device of the first P2P group and a suitable device of the one second P2P group, wherein the suitable device is a first device having inter-group traffic greater than a first predetermined threshold with a fourth device of the first P2P group or the suitable device is a second device having intra-group traffic lower than a second predetermined threshold.

12. The wireless device according to claim 11, wherein monitored inter-group traffic of the wireless device between the first and second P2P groups exceeds a predetermined threshold.

13. The wireless device according to claim 11, wherein inter-group traffic of the wireless device between the first and second P2P groups is greater than intra-group traffic of the wireless device within the first P2P group.

14. The wireless device according to claim 11, wherein the monitor monitors the traffic of the wireless device by counting packets communicated with the another device.

15. A non-transitory recording medium that stores a computer-readable program to make a computer function as a wireless device operable in wireless P2P networks, the computer-readable program comprising a set of instructions to:
   monitor traffic of the wireless device of a first P2P group, the wireless device communicating with another device of at least one second P2P group; and
   alter group formation of the first and the one second P2P group, as to put the wireless device and the another device together in a single P2P group, based on monitored traffic of the wireless device including inter-group traffic of the wireless device, by swapping, by the first P2P group and the one second P2P group, at least one pair of devices including the wireless device of the first P2P group and a suitable device of the one second P2P group, wherein the suitable device is a first device having inter-group traffic greater than a first predetermined threshold with a fourth device of the first P2P group or the suitable device is a second device having intra-group traffic lower than a second predetermined threshold.

* * * * *